United States Patent [19]

Schütz et al.

[11] Patent Number: 4,632,837
[45] Date of Patent: Dec. 30, 1986

[54] PROCESS FOR THE PRODUCTION OF CONCENTRATED EXTRACTS FROM PLANTS

[75] Inventors: Erwin Schütz, Palling; Heinz-Rüdiger Vollbrecht, Stein; Klaus Sandner, Trostberg; Theodor Sand; Peter Mühlnickel, both of Holzminden, all of Fed. Rep. of Germany

[73] Assignees: SKW Trostberg Aktiengesellschaft, Trostberg; Haarmann & Reimer GmbH, Holzminden, both of Fed. Rep. of Germany

[21] Appl. No.: 652,152

[22] Filed: Sep. 18, 1984

Related U.S. Application Data

[63] Continuation of Ser. No. 375,646, May 6, 1982, abandoned.

[30] Foreign Application Priority Data

May 15, 1981 [DE] Fed. Rep. of Germany ....... 3119454

[51] Int. Cl.$^4$ .............................................. A23L 1/28
[52] U.S. Cl. .................................... 426/425; 426/489; 426/655

[58] Field of Search ............... 426/425, 424, 655, 524, 426/489

[56] References Cited

U.S. PATENT DOCUMENTS 3,477,856 11/1969 Schultz ................................ 426/424
3,966,981 6/1976 Schultz ................................ 426/425
3,969,196 7/1976 Zosel ..................................... 203/49

FOREIGN PATENT DOCUMENTS 56-109568 8/1981 Japan .................................... 426/655
1388581 3/1975 United Kingdom .
2026539A 2/1980 United Kingdom .
1575827 10/1980 United Kingdom .

Primary Examiner—George Yeung
Attorney, Agent, or Firm—Felfe & Lynch

[57] ABSTRACT

The present invention provides a process for the production of concentrated extracts from fresh plants or parts thereof by extraction with carbon dioxide at supercritical pressure, wherein the extraction is carried out at 0° to 40° C. and the separation of the concentrated extract is carried out at a subcritical temperature and subcritical pressure.

9 Claims, No Drawings

PROCESS FOR THE PRODUCTION OF CONCENTRATED EXTRACTS FROM PLANTS

This is a continuation of application Ser. No. 375,646 filed on May 6, 1982 (now abandoned).

This invention relates to a process for the production of concentrated extracts from plants. More specifically, the inventive process provides concentrated extracts from fresh plants or parts thereof, expecially from fresh culinary herbs, by extraction with carbon dioxide at super-critical pressures.

One possibility for concentrating and making storage stable the component materials of fresh vegetable materials, namely extraction with water-insoluble solvents, for example hexane or dichloromethane, is unsuccessful because it is not possible to bring the organic extraction agents, which are actually well suited as solvents for the nonpolar component materials, into intimate contact with the high water content plant materials to the extent which is necessary for extraction, i.e. to wetten the plant material, for which reason the yields obtained with such processes are unsatisfactory. It is certainly possible to use lipophilic organic solvents for the extraction of dried plants. However, this process suffers from the disadvantage that drying the plants results, for example, in a loss of essential aroma or odoriferous components which are consequently absent from the extracts.

It is known that the appropriate ethereal oils can be obtained from some plants by steam distillation. However, these only give the aroma and odour of the fresh plants incompletely since they only contain the volatile parts of the component materials and are changed due to the thermal stressing during their production.

Culinary herbs are used for flavouring food not only in fresh form but also in a dried state. It is known that upon drying fresh herbs, the components essential for determining the flavour of the fresh herbs is partly or completely lost. For making the desired flavouring properties of fresh culinary herbs storage stable, use has been made of deep freezing. Another possibility for using and making storage stable the flavouring components of fresh herbs, for example dill, tarragon, onions and the like, consists in preparing alcoholic or acetic acid extracts of the fresh herbs. The extracts often correspond very well to the flavour of the fresh herbs and, in some cases, are used to a large extent in the acid preservation industry. A disadvantage of these extracts is that the flavour-determining principles in these extracts are present in a state of high dilution. Concentration of the extracts, which always contain a certain amount of water, for example by distilling off the water-containing solvent, does not give the desired result since, due to the high temperatures necessary for this purpose, the original flavour is destroyed.

From Federal Republic of Germany Patent Specification No. 21 27 611, it is known to obtain spice extracts of natural composition by extraction with a physiologically acceptable gas, such as carbon dioxide, in a super-critical state as solvent by successively extracting the ethereal oils with dry supercritical gas and extracting the flavouring materials with moist supercritical gas, whereafter the extracts are separated out by changing the pressure and/or temperature and then mixed together. However, this process makes use of air-dried herbs as starting material, for example peppers, cloves, stick cinnamon or vanilla pods. This Patent Specification also points out that it is possible to carry out the extraction with a liquid gas, for example carbon dioxide, below its critical pressure and its critical temperature but that the solubility of the aroma components under supercritical conditions is many times greater than when using the corresponding solvent in a liquid state. However, the two-stage process method is important in which, in the first stage, extraction is carried out with a dry super-critical fluid and, in the second stage, with a moist supercritical fluid.

Federal Republic of Germany Patent Specification No. 21 27 618 describes a process for obtaining hop extracts by extracting air-dried hops with, for example, carbon dioxide, under supercritical conditions, the extract obtained being separated out by lowering the pressure to a subcritical value and the temperature used can lie above or below the critical temperature of the carbon dioxide. However, in the case of this process, too, it is necessary previously to dry the hops to be extracted in order to obtain air-dried hops, which results in considerable disadvantages, namely, a falsification of the flavouring or of the aroma properties of the extract obtained.

German Democratic Republic Patent Specification No. 41,362 describes, in general terms, a process for separating mixtures of materials which, under the process conditions, are liquid and/or solid and which contain organic compounds and/or compounds containing organic groups, wherein the mixture of substances to be separated is treated with a gas under supercritical temperature and pressure conditions, the loaded gas is separated from the residue under supercritical conditions and subsequently the compounds taken up by the supercritical gas phase are recovered by increasing the temperature and/or lowering the pressure. The gas used can be, for example, carbon dioxide. However, this Patent Specification does not disclose a process for the production of concentrated extracts from fresh plants or parts of plants. It merely states that, with the help of a supercritical gas, to which readily volatile organic compounds are added, chlorophyll can be dissolved out from comminuted parts of plants.

Federal Republic of Germany Patent Specification No. 28 01 843 discloses a process for the production of a hop extract wherein liquid carbon dioxide is passed at a temperature of from $-5°$ to $+15°$ C. through a column of hop material, a hop extract of high purity thereby being obtained. In the introductory description of this Patent Specification, it is stated that from British Patent Specification No. 1,388,581, a process is already known for the production of a hop extract by the extraction of hops with various gases in a supercritical state with regard to temperature and pressure, carbon dioxide being said to be the most preferred gas. However, it is stated that the extract obtained by this procedure is, without careful purification, not suitable since it possesses a disadvantageous flavour. The necessary purification would, therefore, necessitate the use of organic solvents, so that one of the main advantages of the use of supercritical carbon dioxide for the extraction of hops, namely the absence of solvent residues, would be sacrificed.

Therefore, it is an object of the present invention to provide a process for the production of a concentrated extract from fresh plants or parts thereof, especially fresh culinary herbs, by extraction with carbon dioxide at supercritical pressure in which, by a single-stage extraction, there is achieved a complete isolation of the flavour and aroma components and especially of the readily volatile components, an extract being obtained which, in contradistinction to the previously employed processes, does not display any impairment of its odoriferous and flavour properties.

Thus, according to the present invention, there is provided a process for the production of concentrated extracts from fresh plants or parts thereof by extraction with carbon dioxide at supercritical pressure, wherein the extraction is carried out at 0° to 40° C. and the separation of the concentrated extract is carried out at a subcritical temperature and subcritical pressure.

Surprisingly, we have found that when using these process conditions, the component materials of fresh plants can be obtained completely quantitatively by a single-stage extraction and with the original composition.

Even though it is possible to carry out the process according to the present invention at a temperature of up to about 45° C., the temperature during the extraction should preferably be not more than 9° C. above the critical temperature of carbon dioxide, which is 31° C., whereas in the case of the separation, use should be made of a temperature which is distinctly below the critical temperature but which preferably is not substantially greater than 20° C. According to the present invention, it is preferred to carry out the extraction at a temperature of 0° to 40° C. and more preferably of 0° to 31° C. and, in the case of the separation, to employ a temperature of from −20° to +31° C. and preferably of from 0° to 20° C.

According to a preferred embodiment of the process according to the present invention, for the extraction use is made of plants or of parts thereof which have a water content of 30% or more so that, as a rule, a previous drying of the material is not necessary and, in any case, a mechanical separation of the water can be brought about, for example by centrifuging.

In the case of a preferred embodiment of the process according to the present invention, the extraction is carried out at a pressure of from the critical pressure (73.8 bar) to 300 bar and preferably at a pressure of from about 80 to 200 bar. In the case of the separation of the extract, according to the present invention it is preferred to carry this out at a pressure of from 20 to 60 bar.

According to another preferred embodiment of the process according to the present invention, it is possible to free the extract obtained from water by treatment with a volatile solvent, for example with a water-immiscible solvent, such as diethyl ether or pentane.

The extraction according to the present invention is preferably carried out in the form of a cyclic process in which the carbon dioxide first flows through an extraction vessel, which is a pressure vessel operated at a pressure of from 74 to 300 bar, preferably at a pressure of from 74 to 200 bar and more preferably at a pressure of 80 to 200 bar and at a temperature of from 0° to 45° C., preferably at a temperature below 40° C. and more preferably at a temperature of 0° to 31° C. The separation of the extract from the solution contained in the extraction vessel takes place in an after-connected separation vessel in which the separation takes place by lowering the pressure to a subcritical value, i.e. below 74 bar and preferably to 20 to 60 bar, at a temperature below the critical temperature of 31° C. The carbon dioxide liberated in the separation of the extract is subsequently again used for the extraction.

The process according to the present invention is especially well suited for the extraction of fresh herbs, the aroma of which is desired in foodstuffs, for example dill, tarragon, marjoram, chervil, basil, savory, parsley, celery leaves, thyme, rosemary, sage, fenchel, lovage and the like, as well as for plants which are used in a fresh state for flavouring food, for example chives, onions, leaks, garlic and the like. For the extraction, these herbs or plants can be used fresh or deep-frozen, comminuted or non-comminuted. The water content of the fresh herbs can be 70 to 85% but can be reduced to about 30% by appropriate measures, for example by centrifuging.

The process according to the present invention is also suitable for the extraction of other fresh plants or plant parts, for example cassia buds, mimosa flowers, roses, lavender and the like, in the extracts of which it is desired to have all the odoriferous components of the fresh flower or bud.

The extracts prepared by the one-stage process of the present invention from fresh plants possess, surprisingly, the typical odour and flavour of the starting materials, they are of almost unlimited storage stability and, in addition, have the advantage that they are practically free of micro-organisms.

The extracts obtained by the process according to the present invention contain a more or less large amount of water which is co-extracted from the plant material which has a high water content. Frequently, even a mechanical separation of the water is possible, for example by centrifuging. In other cases, a complete separation of the water is desired. This can be achieved, for example, by taking up the water-containing extract in a water-immiscible solvent, for example diethyl ether or pentane or in some other readily volatile solvent, separating off the water and subsequently removing the solvent. The water-free extracts can also be obtained by drying the extract-laden gas, before the separation, with the help of a sorption filter filled with a drying agent which acts selectively for water.

Besides the advantage of being capable of being carried out in one stage and of giving a concentrated extract which reproduces the complete aroma of the fresh plants, the process according to the present invention also possesses the advantage of saving the heat energy otherwise necessary in the case of the previously known processes for drying the herbs because the extraction can be carried out with freshly collected or harvested plants.

The following examples are given for the purpose of illustrating the present invention:

EXAMPLE 1

20 kg. of chopped fresh dill are extracted at 120 bar and at 25° C. for 1 hour with carbon dioxide. The extract is separated by lowering the pressure to 40 bar at 8° C., 1.6 kg. of a yellowish-green, water-containing extract being obtained. The extract has a very intensive aroma which corresponds to that of fresh dill. The extracted dill is practically odourless.

EXAMPLE 2 (COMPARATIVE)

20 kg. of chopped fresh dill are extracted at 160 bar and at 45° C. for 1 hour with carbon dioxide. The extract is separated by lowering the pressure to 60 bar at 45° C., 0.7 kg. of a yellowish-green, water-containing extract being obtained. The extract has an aroma which only possesses a remote similarity to that of the fresh herb. A mouldy smell preponderates in the extracted dill.

EXAMPLE 3

650 g. of fresh tarragon leaves are comminuted and centrifuged, 280 g. of water thereby being separated. 360 g. of the so-treated tarragon are extracted for 4 hours with carbon dioxide at 30° C. The separation of the extract is carried out at 35 bar and 10° C., there being obtained 16 g. of an extract which smells and tastes very intensively like tarragon. The extracted material is practically odourless. The extract is extracted twice with 20 ml. amounts of isopentane and separated from water. After distilling off the solvent, 1.5 g. of an oil is obtained which has an extremely intensive odour of tarragon.

EXAMPLE 4

12 kg. of comminuted fresh cassia buds are extracted for 1 hour at 122 bar and 26° C. with carbon dioxide. The extract is separated by lowering the pressure to 38 bar at 7° C., 0.7 kg. of a yellowish-green extract being obtained. The extract has a very intense aroma which corresponds to that of fresh cassia buds. The extraction residue is practically odourless.

EXAMPLE 5

15 kg. of comminuted fresh mimosa flowers are extracted for 1 hour at 100 bar and 200° C. with carbon dioxide. By lowering the pressure to 40 bar and lowering the temperature to 10° C., 1.2 kg. of a water-containing extract are separated out. The extract smells intensively of mimosa, whereas the extraction residue is practically odourless.

It will be understood that the specification and examples are illustrative but not limitative of the present invention and that other embodiments within the spirit and scope of the invention will suggest themselves to those skilled in the art.

What is claimed is:

1. Process for the production of a concentrated extract of odor and aroma components from fresh plants or plant parts containing these components, comprising the steps of completely isolating the flavor and aroma components by extracting in a single stage extraction, plants or plant parts having a water content of 30% or more, with carbon dioxide at super-critical pressure and at a temperature of from 0° to 40° C., and then separating the concentrated extract at sub-critical temperature and sub-critical pressure.

2. Process as claimed in claim 1, wherein the extraction is carried out at a temperature of from 0° to 31° C.

3. Process as claimed in claim 1, wherein the extraction is carried out at a pressure of from 80 to 200 bars.

4. Process as claimed in claim 1, wherein the separation of the extract is carried out at a pressure of from 20 to 60 bars.

5. Process as claimed in claim 1, wherein the separation of the extract is carried out at a temperature of from −20° to +31° C.

6. Process as claimed in claim 1, wherein the separation of the extract is carried out at a temperature of from 0° to 20° C.

7. Process as claimed in claim 1, wherein the extract is freed from water by treatment with a volatile solvent.

8. Process as claimed in claim 1, wherein whole fresh plants are extracted.

9. Process as claimed in claim 1, wherein chopped fresh dill is extracted at a pressure of about 120 bars and at a temperature of about 25° C.

* * * * *